United States Patent [19]

Garcia

[11] 4,179,582

[45] Dec. 18, 1979

[54] HIGH VOLTAGE HIGH CURRENT CABLE TERMINAL WITH DUAL GRADING CAPACITOR STACK

[75] Inventor: Felipe G. Garcia, Sunnyvale, Calif.

[73] Assignee: Electric Power Research Institute, Inc., Palo Alto, Calif.

[21] Appl. No.: 854,155

[22] Filed: Nov. 23, 1977

[51] Int. Cl.² .................... H02G 15/22; H01B 17/28
[52] U.S. Cl. ................... 174/15 BH; 174/19; 174/73 R; 174/143
[58] Field of Search ......... 174/15 BH, 16 BH, 73 SC, 174/73 R, 143, 19; 361/302

[56] References Cited

U.S. PATENT DOCUMENTS

| 1,899,752 | 2/1933 | Estorff | 174/73 |
| 2,068,624 | 1/1937 | Atkinson | 174/73 R |
| 2,071,102 | 2/1937 | Atkinson et al. | 174/73 R X |
| 3,197,551 | 7/1965 | Linderholm | 174/73 |
| 3,673,305 | 6/1972 | Mashikian et al. | 174/73 R X |
| 3,692,928 | 9/1972 | Friedrich | 174/143 |
| 3,716,652 | 2/1973 | Lusk et al. | 174/15 R |
| 3,758,699 | 9/1973 | Lusk et al. | 174/19 |

FOREIGN PATENT DOCUMENTS

| 227877 | 4/1960 | Australia | 174/19 |
| 1050850 | 2/1959 | Fed. Rep. of Germany | 174/143 |

Primary Examiner—Bruce A. Reynolds
Assistant Examiner—E. F. Borchelt
Attorney, Agent, or Firm—Flehr, Hohbach, Test, Albritton & Herbert

[57] ABSTRACT

A high voltage terminal or connection to a high voltage conductor includes internal and external grading capacitor stacks which form a closed dielectric filled chamber. All of the foregoing provides uniform voltage distributions between various interfaces.

10 Claims, 3 Drawing Figures

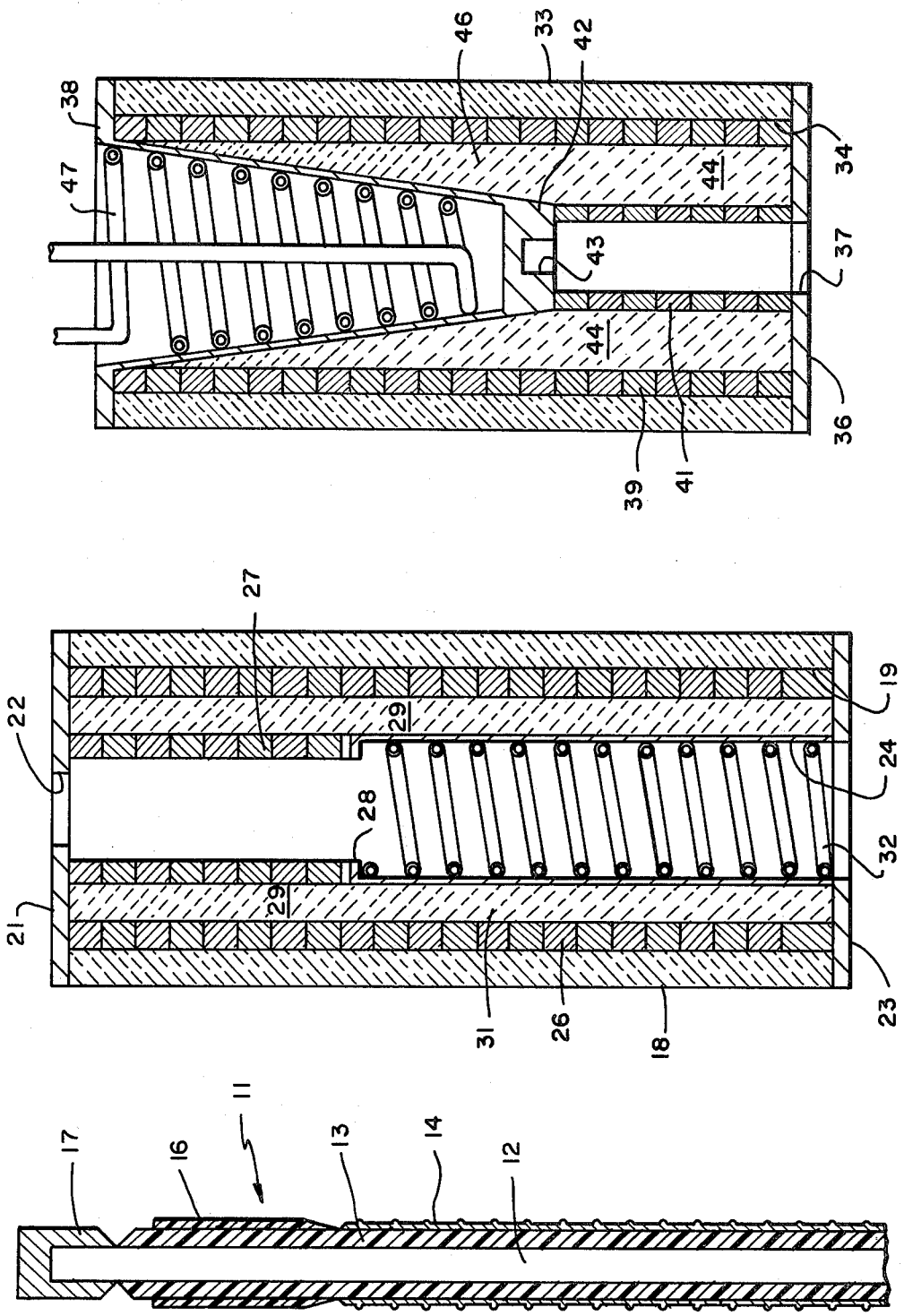

HIGH VOLTAGE HIGH CURRENT CABLE TERMINAL WITH DUAL GRADING CAPACITOR STACK

BACKGROUND OF THE INVENTION

This invention relates to a high voltage cable terminal, and more particularly to such a terminal for use in high voltage circuits carrying high current levels.

Presently there is a trend in power transmission circuits to increase the power density in power transmission corridors, which has necessitated forced cooling of enclosed power transmission cables. Without such cooling the high current density in the conductors would create localized heating, which could exceed proper operating temperatures for the cable insulation. Cable terminals in such a system are not readily cooled however, and can impose a thermal bottleneck in the power transmission system.

A typical available self-cooled high voltage cable terminal has a conductor plate on one end and a ground ring on the other. Extending between the conductor plate and the ground ring is an external ceramic shell which surrounds an annular capacitor stack having one end coupled to the conductor plate and the other end connected to the ground ring. The conductor plate is adapted to receive a connector attached to one end of the high voltage conductor, and the ground ring is adapted to pass the insulated high voltage cable therethrough. A large amount of paper insulation is applied about that portion of the insulated cable that passes through the ground ring and the annular capacitor stack. The capacitor stack serves to grade the interface between the surrounding air and the exterior surface of the ceramic insulating shell as well as the interface between the high voltage cable and the applied paper insulation.

A force cooled cable termination is disclosed in U.S. Pat. No. 3,758,699 which shows circulation of an insulating dielectric liquid to certain internal regions of the high voltage cable terminal and then through a heat exchanger. This disclosure includes an external insulating shell surrounding an internal annular capacitor stack with a channel formed therebetween for passage of the cooling dielectric liquid. A high voltage cable has a conductor terminated at one end of the terminal and passing through the annular capacitor stack. That portion of the insulated high voltage cable passing through the capacitor stack has additional paper insulation wrapped therearound, and heat generated within the cable contained within the terminal is carried away by the circulating dielectric cooling fluid.

Assembly time of high voltage, high current terminals of the type described above is done substantially in the field, due to the requirement for manual application and adjustment of heavy paper insulation rolls and taping. The application of the insulation is variable from workman to workman, and the flow path for the cooling dielectric fluid is subject to interruption and consequent terminal failure due to overheating. Additionally, since the circulating cooling dielectric fluid is exposed to the electric field within the terminal, it must be continuously filtered and maintained as uncontaminated as possible lest its dielectric properties deteriorate and precipitate an electrical failure in the terminal down the cooling channel.

Consequently, there is a need for a high voltage, high current terminal which is substantially assembled under controlled conditions in the factory, which is self-cooled, which may be easily modified to serve in force cooled applications, and which will operate reliably.

OBJECTS AND SUMMARY OF THE INVENTION

It is an object of the present invention to provide a high voltage, high current cable terminal which provides access to a length of cable near the terminal end for cooling and consequent inducement of rapid heat flow away from the terminal through the conductor.

Another object of the present invention is to provide a high voltage, high current level cable which substantially reduces manual operations in terminating high voltage cables in the field.

Another object of the present invention is to provide a high voltage, high current level cable terminal with increased reliability due to the lack of necessity for directing flow of a cooling fluid through the electrical field within the terminal.

Another object of the present invention is to provide a high voltage, high current level cable terminal which does not require special cable terminal sections.

Another object of the present invention is to provide a high voltage, high current level cable terminal which is self-cooled in moderate applications, and which may be easily modified to a force cooled terminal in more severe applications.

A high voltage cable terminal capable of transmitting a high current level includes an insulating shell having a conductor end member attached to one end of the shell and a ground end member attached to the other end of the shell. An annular external capacitor stack is mounted adjacent to the inside wall of the insulating shell having one end connected to the conductor end member and the other end connected to the ground end member. A shorter internal capacitor stack extends between the conductor and ground end members, being spaced from the external capacitor stack and being mounted substantially concentric therewith. The capacitor stacks and the end members form a chamber therebetween which contains dielectric. The conductor end member is formed to accept one end of a high voltage conductor, and the ground end member is formed to pass an insulated high voltage cable.

BRIEF DESCRIPTION OF THE DRAWINGS

FIG. 1 is a sectional view of a terminal end of a conventional high voltage cable;

FIG. 2 is a sectional side elevational view of the disclosed high voltage cable terminal; and FIG. 3 is a sectional elevational view of another embodiment of the disclosed high voltage cable terminal.

DETAILED DESCRIPTION OF THE PREFERRED EMBODIMENTS

FIG. 1 shows a high voltage cable 11 having a centrally located conductor 12 running therethrough. Cable insulation 13 is shown surrounding conductor 12. An outer layer of insulation shield and skid wires 14 surrounds insulation 11. The insulation shield and skid wires 14 are removed for a length along cable 11 which is adjacent to the terminal end of the cable. A thin walled paper tube or roll 16 is applied over the insulation 13 where the insulation shield and skid wires 14 have been removed. Thin walled paper tube 16 is for the purpose of sizing the outside diameter of the cable to the mating inside diameter of the high voltage high current level cable terminal to be hereinafter described. The cable insulation 13 is removed from a short length of the cable 11 near the terminal end, thereby exposing a length of conductor 12. A high voltage connector 17 is attached to the exposed length of conductor 12.

Turning now to FIG. 2, an external insulating shell 18 is shown, which may be of ceramic or porcelain, and which has an inside wall 19. A conductor end plate 21 has a connector aperture 22 therein. Conductor end plate 21 is attached to one end of insulating shell 18. A metallic ground end member 23 is attached to the other end of insulating shell 18, having a metallic tubular extension 24 thereon extending inwardly along the axis of insulating shell 18. An annular external grading capacitor column 26 has one end connected to ground-member 23. External grading capacitor column 26 is mounted adjacent to inside wall 19 of insulation shell 18. Mounted concentrically with external grading capacitor column 26 is an annular internal grading capacitor column 27, which is spaced from external column 26. Internal column 27 is considerably shorter in length than external capacitor column 26. Consequently, a chamber 29 is formed between internal and external capacitor columns 27 and 26 respectively, conductor end plate 21, and ground end member 23 with the tubular extension 24 thereon. Tubular extension 24 has an aperture 28 therethrough formed to allow the terminal end of high voltage cable 11 to pass. An oil-impregnated paper, or other suitable dielectric, either solid or fluid, 31 is disposed within chamber 29 under pressure. Connector aperture 22 is formed to accept high voltage connector 17. It may be seen that when connector 17 is attached within aperture 22 paper sizing tube 16 is contained within internal grading capacitor column 27. A considerable length of cable 11 is then accessible within tubular extension 24 after termination of the high voltage cable 11 is made.

In the embodiment of FIG. 2 there are two annular grading capacitor columns. The external capacitor column 26 serves to grade the voltage differential between conductor end plate 21 and ground end member 23 at the interface between insulating shell 18 and the surrounding air. Internal grading capacitor column 27 serves to grade axially the high voltage at the several interfaces between dielectric 31 and the high voltage cable insulation 13. Since these last named interfaces lie within a pressurized oil ambient, their dielectric strength is substantially greater than that of air. This permits operation across internal grading capacitor column 27 at higher axial voltage stresses, and therefore a much shorter internal capacitor column 27. Dissipation of heat generated by power losses within the high voltage cable terminal of FIG. 2 is provided by conduction through dielectric 31, end plate 21, insulating shell 18, and ground end member 23 including the wall of tubular extension 24.

In terms of typical dimensions for a 345 kv system the terminal of FIG. 2 is approximately nine feet in axial length. Internal grading capacitor column 27 is approximately three feet in length. It may be seen therefore, that about six feet of high voltage cable 11 is accessible inside tubular extension 24 for cooling. One embodiment of this invention includes a cooling coil 32 within tubular extension 24 surrounding high voltage cable 11. By routing a refrigerated cooling fluid through cooling coil 32 the lower six feet of high voltage cable 11 within the terminal of FIG. 2 may be overcooled. Due to the high temperature differential induced in conductor 12 between the upper three feet of conductor 12 and the lower six feet thereof, a high rate of axial heat flow may be obtained in conductor 12 away from the terminal end. Note that the cooling fluid transiting cooling coil 32 is not subjected to a voltage differential, and is therefore not subject to dielectric breakdown.

Turning now to FIG. 3 a high power density terminal is shown having an external insulating shell 33 with an internal wall 34. A ground end plate 36 is attached to one end of external insulating shell 33, having an aperture 37 therethrough accepting passage of the terminal end of high voltage cable 11 shown in FIG. 1. A conductor extension 38 is attached to the opposite end of insulating shell 38, which is shown as having a frusto-conical shape with the minor diameter base extending inwardly along the axis of insulating shell 33. It should be understood that conductor extension 38 could assume a configuration similar to that of ground end member 23 of FIG. 2. An annular external grading capacitor column 39 is shown mounted adjacent to internal wall 34 of insulating shell 33. A shorter annular internal grading capacitor column 41 is shown mounted concentrically with external grading capacitor column 39 and spaced therefrom. External grading capacitor column 39 has one end connected to conductor extension 38 and the opposite end connected to ground plate 36. Internal grading capacitor column 41 has one end connected to a minor diameter base 42 on frusto-conical conductor extension 38 and the opposite end connected to ground plate 36. Minor diameter base 42 has a receptacle 43 formed therein for receiving high voltage connector 17. It may therefore be seen that the terminal end of high voltage cable 11 may be inserted through aperture 37 until high voltage connector 17 is engaged by receptacle 43. Paper sizing tube 16 positions the terminal end of high voltage cable 11 within the inside diameter of annular internal grading capacitor column 41. Since the dimensions of the high voltage cable terminal of FIG. 3 are about the same as those recited for FIG. 2 above, the lower six feet of high voltage cable 11 normally contained within presently available terminals is again free for cooling to induce heat flow through conductor 12 as described above in connection with FIG. 2.

A chamber 44 is formed between external and internal capacitor stacks 39 and 41 respectively, having one end closed by conductor extension 38 and the other end closed by ground plate 36. Chamber 44 is filled with pressurized oil-impregnated paper or other suitable dielectric 46. Dissipation of the heat generated by power losses within the terminal of FIG. 3 is afforded by conduction through the dielectric 46 within chamber 44, through external insulating shell 33, ground plate 36, and the broad conical surface of conductor extension 38. In the event a more severe heat dissipation problem is presented by the power density requirements at the terminal of FIG. 3, a cooling coil 47 is disposed within the conical cavity formed by a conductor extension 38. Heat conduction through the broad conical surface of conductor extension 38 is thereby aided by a coolant circulated through coil 47. Heat energy is carried away from the broad surface of conductor extension 38 by the flowing coolant.

Chamber 44 may contain a fluid dielectric rather than oil-impregnated paper or other solid dielectric, providing the dielectric strength of the fluid is sufficiently high to withstand the voltage stress it would be subjected to.

The use of a fluid delectric would enhance heat transfer in the terminal through convection.

In summary a high voltage terminal is provided for connecting to a high voltage conductor having a paper roll around its end. The terminal has an external ceramic insulator shell with a conductor end plate attached to one end thereof and a ground member attached to the other end. An external grading capacitor stack extends between the conductor end plate and the ground member adjacent to the inside wall of the ceramice insulating shell. A shorter internal grading capacitor stack is connected at one end to the conductor end plate and at the other end to an extension metallic tube on the ground member. The internal capacitor stack is spaced radially from the external capacitor stack, forming a chamber therebetween, which is closed at one end by the conductor plate and at the other end by the ground member. The external capacitor stack serves to grade the axial voltage distribution at the air/ceramic interface to achieve approximately uniform axial voltage stress and the internal capacitor stack serves to grade the cable/paper roll interface. The chamber between the capacitor stacks is filled with a dielectric such as oil-impregated paper, under oil pressure, or some other suitable material. The pressurized dielectric oil which fills the pipe in which the cable is contained will pressurize the cable/paper roll interface and the paper roll/capacitor stack interface. Thus operation at higher axial stresses at the internal capacitor stack is allowable, resulting in a much shorter internal capacitor column. A cooling coil is contained within the portion of the ground member extending between one end of the terminal and the short internal capacitor stack. A high voltage cable terminating a high power density conductor at the conductor plate and passing through the annular internal capacitor stack and cooling coils dissipates most of the heat resulting from internal power loss by conduction down the conductor from the terminal end as the coils overcool that portion of the conductor surrounded thereby. The remaining portion of the heat is dissipated by conduction upward through the conductor to the external members connected to the high voltage end of the terminal. A portion of the heat generated in the dielectric within the capacitor stacks and in the chamber between the stacks is dissipated by conduction to the cooling coil. The remaining portion is dissipated by conduction to the external porcelain and hence to the surrounding air.

What is claimed is:

1. A high voltage cable terminal for an insulated high voltage cable having a high current carrying capacity, comprising: an insulating shell, an external grading capacitor stack mounted adjacent to the inside surface of said insulating shell and operating to grade the interface between said insulating shell and the surrounding environment, an internal grading capacitor stack mounted substantially concentrically within and being shorter than said external capacitor stack, being spaced therefrom, being adapted to surround the high voltage cable, and operating to grade the interface between the insulated high voltage cable and surrounding insulation, a conductor end member mounted at one end of said shell closing one end of the space between said internal and external capacitor stacks, a ground end member mounted at the other end of said shell closing the other end of the space between said internal and external capacitor stacks, whereby a closed chamber is formed therebetween, a dielectric within said closed chamber, said conductor and ground end members being formed to connect to a high voltage conductor and to pass the insulated high voltage cable respectively.

2. A high voltage cable terminal as in claim 1 where said dielectric is an insulating fluid included within said closed chamber.

3. A high voltage cable terminal as in claim 1 wherein said ground end member has a bore extending inwardly of said insulating shell and said internal grading capacitor stack is disposed toward said conductor end members, and a cooling coil mounted within said bore, whereby overcooling of the insulated high voltage cable when passing therethrough withdraws heat by conduction from the conductor within said internal capacitor stack.

4. A high voltage cable terminal as in claim 1 wherein said conductor end member comprises a frusto-conical shell extending inwardly on the axis of said insulating shell, said internal capacitor stack being displaced toward said ground end member, whereby heat from the high voltage cable within said internal capacitor stack is transferred by conduction through said dielectric, said frusto-conical shell and said insulating shell.

5. A high voltage cable terminal as in claim 4 together with a cooling coil mounted within said frusto-conical shell, whereby heat conduction therethrough is aided.

6. A high voltage cable terminal having a high current capacity, comprising an insulating shell, a conductor end member attached to one end of said insulating shell, a ground end member attached to the other end of said insulating shell, an annular external capacitor stack mounted adjacent to the inside diameter of said insulating shell between said conductor and ground end members, an annular internal capacitor stack being shorter than and spaced from said external stack mounted substantially concentric therewith between said conductor and around end members, said capacitor stacks and end members forming a chamber therebetween, and pressurized oil-impregnated paper or other solid dielectric within said chamber, said conductor and ground end members being formed to accept an end of a high voltage conductor and to pass an insulated high voltage cable respectively.

7. A high voltage cable terminal as in claim 6 wherein said conductor end member is a conducting shell extending inwardly along the axis of said insulation shell, whereby a large heat conducting shell surface is exposed to the surrounding environment.

8. A high voltage cable terminal as in claim 7 together with a cooling coil adjacent said large heat conducting surface and heat conduction therethrough is aided.

9. A high voltage cable terminal as in claim 6 wherein said ground end member has a bore extending inwardly along the axis of said insulating shell, together with a cooling coil disposed within said bore for surrounding the insulated high voltage cable, whereby additional cooling is obtainable by heat conduction from the end of the high voltage conductor.

10. A high voltage cable terminal as in claim 6 together with a dielectric fluid within said chamber.

* * * * *